United States Patent
Cromer et al.

(10) Patent No.: US 6,330,624 B1
(45) Date of Patent: Dec. 11, 2001

(54) ACCESS LIMITING TO ONLY A PLANAR BY STORING A DEVICE PUBLIC KEY ONLY WITHIN THE PLANAR AND A PLANAR PUBLIC KEY ONLY WITHIN THE DEVICE

(75) Inventors: Daryl Carvis Cromer; Dhruv Manmohandas Desai; Howard Jeffrey Locker, all of Cary; James Peter Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/246,383

(22) Filed: Feb. 9, 1999

(51) Int. Cl.[7] .............................. G06F 12/14; H04L 9/30; H04L 9/32
(52) U.S. Cl. .............................. 710/37; 710/74; 710/200; 711/164; 713/193; 713/200; 713/169; 713/170
(58) Field of Search .................................... 713/168–171, 713/182, 189, 193, 194, 200; 711/163, 164; 710/37, 74, 200; 380/30, 282, 285

(56) References Cited

U.S. PATENT DOCUMENTS

| 5,012,514 |   | 4/1991  | Renton ........................... 713/192 |
| 5,311,595 | * | 5/1994  | Bjerrum et al. ................... 380/25 |
| 5,375,243 |   | 12/1994 | Parzych et al. ................... 713/202 |
| 5,442,706 | * | 8/1995  | Kung .............................. 380/30 |
| 5,623,637 | * | 4/1997  | Jones et al. ..................... 711/164 |
| 5,675,321 |   | 10/1997 | McBride ......................... 340/568.2 |
| 5,949,882 | * | 9/1999  | Angelo ............................ 380/2 |
| 5,953,422 | * | 9/1999  | Angelo et al. ..................... 380/23 |

OTHER PUBLICATIONS

IBM Technical Disclosure Bulletin, "Method for Normal/Maximum Level on Hard Disk Passord," vol. 37 No. 06A, Jun. 1994, pp. 443–444.

* cited by examiner

Primary Examiner—Thomas Lee
Assistant Examiner—Ilwoo Park
(74) Attorney, Agent, or Firm—Bernard D. Bogdon; Bracewell & Patterson, L.L.P.

(57) ABSTRACT

A data processing system and method are disclosed for protecting data stored on a device included within the system. A device key pair is established which identifies a particular device included within the system. The device key pair includes a device public key and a device private key. The device includes data stored on the device which may not be fully accessed initially. A planar key pair is established which identifies a planar board included within the system. The planar key pair includes a planar public key and a planar private key. The particular device is associated with the planar by storing the device public key only within the planar, and by storing the planar public key only within the device. Access to the data stored within the device is limited to only a planar which has the stored device public key.

21 Claims, 4 Drawing Sheets

ACCESS LIMITING TO ONLY A PLANAR BY STORING A DEVICE PUBLIC KEY ONLY WITHIN THE PLANAR AND A PLANAR PUBLIC KEY ONLY WITHIN THE DEVICE

BACKGROUND OF THE INVENTION

1. Field of the Invention

The present invention relates in general to data processing systems and, in particular, to a data processing system and method for prohibiting unauthorized access of data stored on a system device. Still more particularly, the present invention relates to a data processing system and method for prohibiting unauthorized access of data stored on a system device by uniquely authenticating a planar board within the system with a particular device.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

The most important asset in a computer system is the data stored on a device within the system. The data may be stored on any type of device, such as a universal serial bus (USB) device or any type of hard drive, tape, optical drive, or readable/writable CD-ROM drive. Currently, solutions exist which include password security to protect against unauthorized access to the computer system itself. However, this level of security is inadequate to protect the data stored on a hard drive when the hard drive is physically removed from the computer system or inserted into a different computer system. In systems using this type of protection, by inserting the hard drive into a different system, an unauthorized user may gain access to the data stored on the drive.

Encryption algorithms are known to ensure that only the intended recipient of a message may read and access the message. One known encryption algorithm is an asymmetric, or public key, algorithm. The public key algorithm is a method for encrypting messages sent from a first computer system to a second computer system. This algorithm provides for a public key and a private key pair for each computer system which is unique to each computer system. Each computer system has its own associated public and private key pair which is stored within that computer system.

Prior to the first computer system transmitting a message, the first computer system obtains the public key of the intended recipient of the message, in this case the second computer system. The public key of the second system is obtained by the first computer system from the second computer system. The first computer system then encrypts message using its private key and the public key of the second computer system. The message is then transmitted to the computer identified by the public key, i.e. the second computer system. Upon receipt of the message, the second computer utilizes its private key and the public key of the first computer system to decrypt the message.

The asymmetric encryption algorithm does not provide any security to protect data stored on a hard drive. The algorithm also does not prohibit an unauthorized user from removing a hard drive for use in a different computer system where existing passwords are known.

Therefore a need exists for a data processing system and method for prohibiting unauthorized access of data stored on a device, such as a hard drive, when the device is removed from its associated computer system.

SUMMARY OF THE INVENTION

A data processing system and method are disclosed for protecting data stored on a device included within the system. A device key pair including a device public key and device private key is established which identifies a particular device included within the system. The device includes data stored on the device which may not be fully access initially. A planar key pair including a planar public key and planar private key is established which identifies a planar board included within the system. The particular device is associated with the planar by storing the device public key only within the planar, and by storing the planar public key only within the device. Access to the data stored within the device is limited to only a planar which has the stored device public key.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

The present invention is a method and system for prohibiting unauthorized access of data stored on a device, such as a hard drive, by associating a particular planar board with a particular hard drive. A device key pair is established which identifies a particular device included within the system. A planar key pair is established which identifies a particular planar board included within the system. The device key pair includes a device public key and a device private key. The planar key pair includes a planar public key and a planar private key.

The particular device is uniquely authenticated to and associated with the particular device by storing the device public key only within the planar, and by storing the planar public key only within the device. When a planar attempts to transmit a message to the hard drive coupled to the planar, the planar utilizes the hard drive public key stored within the planar to encrypt the message utilizing an encryption algorithm. Thereafter, the message is transmitted. If the stored public key identifies the hard drive coupled to the planar, the hard drive will receive and be able to decode the message. However, if a different hard drive has been coupled to the planar, the message will not be received by the hard drive because the stored public key utilized by the planar will not identify the new hard drive. Therefore, in the manner, if an unauthorized user removes a hard drive from its associated planar, the data will be protected because other planar boards will not have stored the public key for this particular hard drive. Access to the data stored within the hard drive is limited to only a planar including the stored device public key.

The data processing system may be included as a client within a network including a server computer system. In such a configuration, in the event a key is lost or corrupted, the server computer system may be utilized to download the necessary key.

Figure 1:
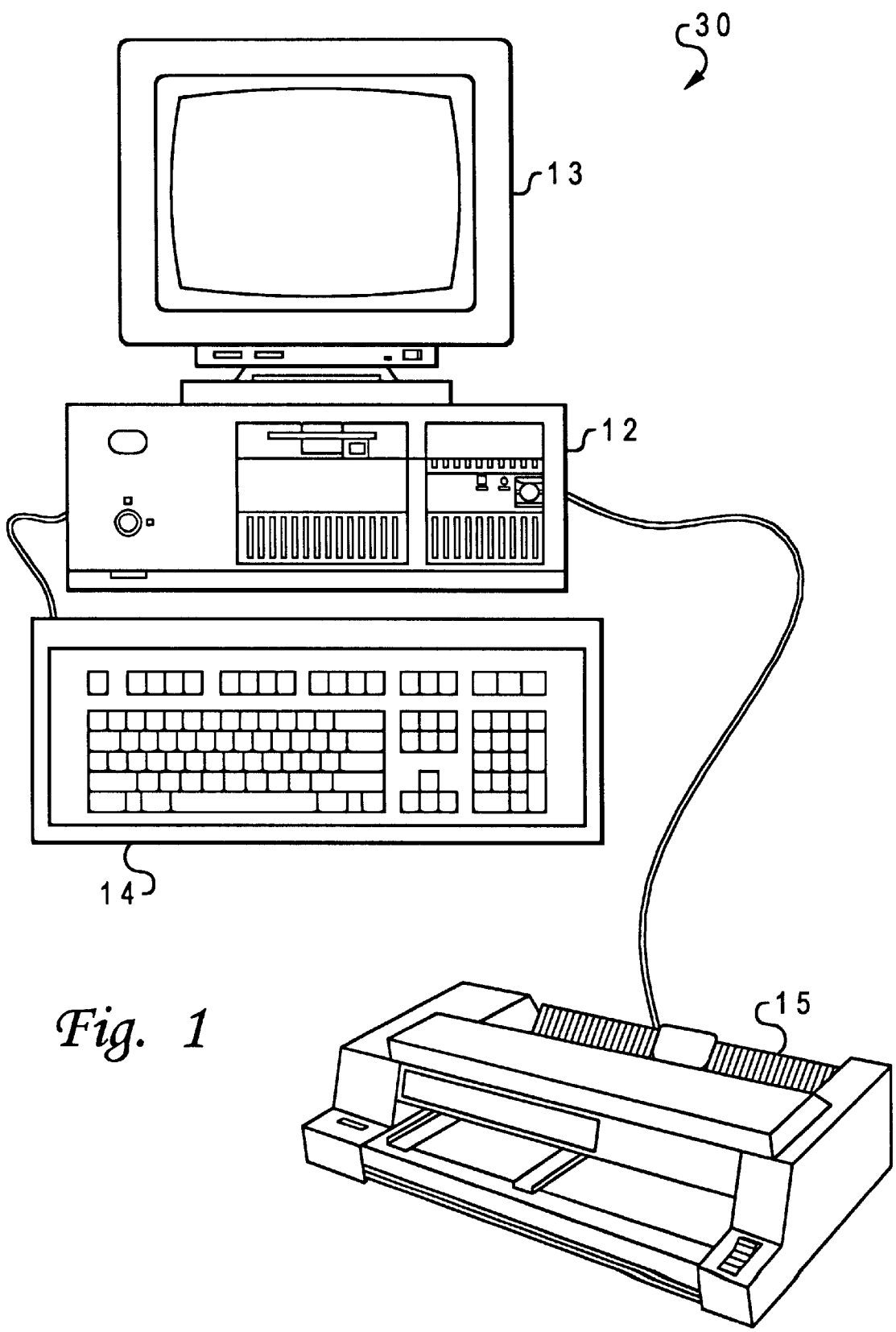
FIG. 1 illustrates a pictorial representation of a data processing system capable of prohibiting unauthorized access of data stored on a device, such as a hard drive, in accordance with the method and system of the present invention.

FIG. 1 illustrates a pictorial representation of a data processing system capable of prohibiting unauthorized access of data stored on a device, such as a hard drive, in accordance with the method and system of the present invention. Computer system 30 includes a computer 12, a monitor 13, a keyboard 14, and a printer or plotter 15. Computer system 30 may be implemented utilizing any commercially available computer system which has been suitably programmed and which has been modified as described below.

Figure 2:
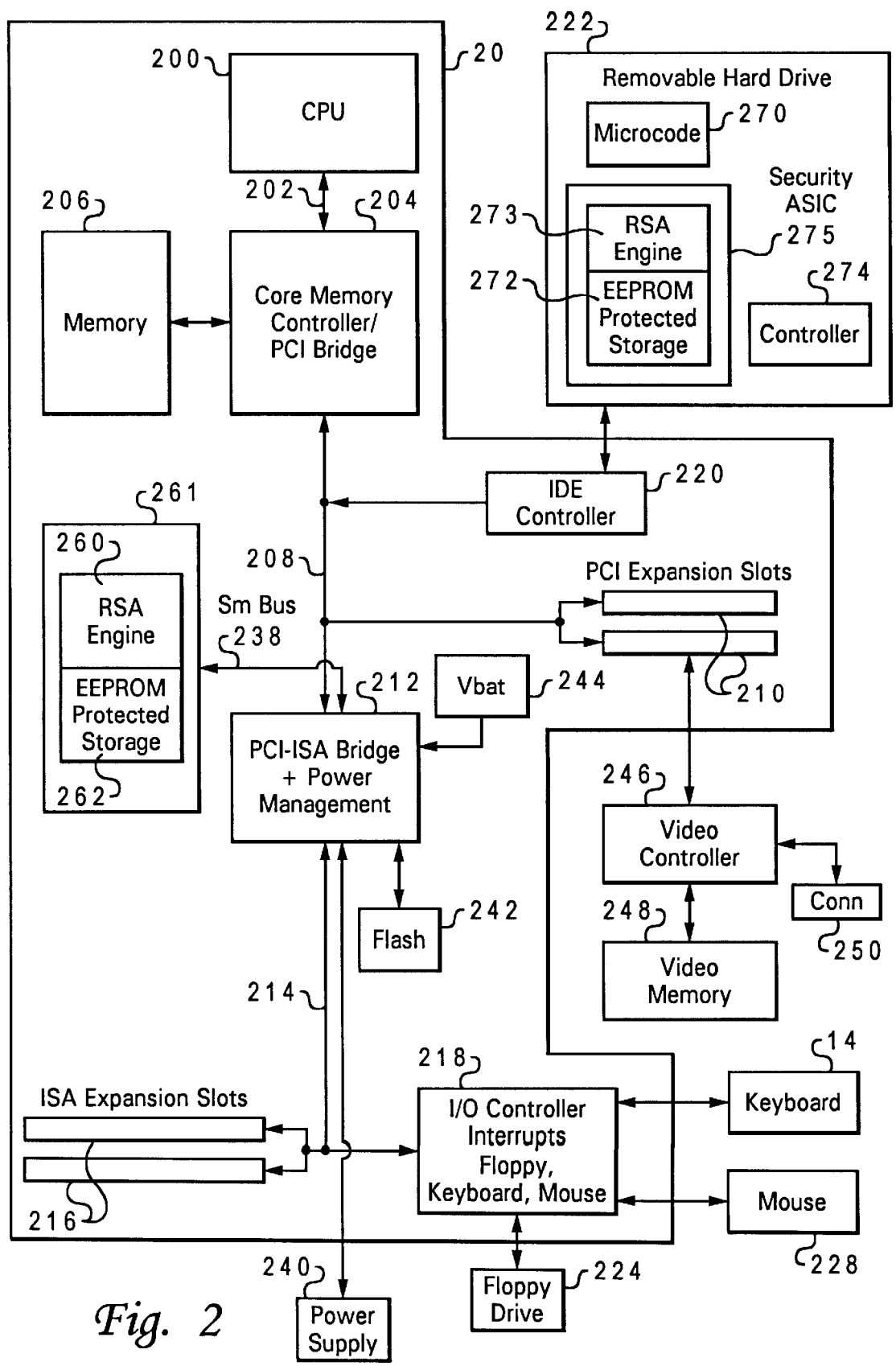
FIG. 2 depicts a more detailed pictorial representation of the data processing system of FIG. 1 in accordance with the method and system of the present invention.

FIG. 2 depicts a more detailed pictorial representation of the data processing system of FIG. 1 in accordance with the method and system of the present invention. Computer 12 includes a planar 20 (also commonly called a motherboard or system board) which is mounted within computer 12 and provides a means for mounting and electrically interconnecting various components of computer 12 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer 12 includes a video controller 246 which may, for example, be plugged into one of PCI expansion slots 210. Video controller 246 is connected to video memory 248. The image in video memory 248 is read by controller 246 and displayed on monitor 13 which is connected to computer 12 through connector 250.

Computer system 12 includes a power supply 240 which supplies full normal system power, and has an auxiliary power main AUX 5 which supplies full time power to the power management logic 212.

In accordance with the present invention, planar 20 includes a security ASIC 261 which includes an encryption/decryption engine 260 which includes an encryption/decryption algorithm which is utilized to encode and decode messages transmitted and received by planar 20 and protected storage 262. Engine 260 is preferably an RSA public key crypto-system. Engine 260 may access a protected storage device 262. Protected storage device 262 is accessible only through engine 260. Therefore, storage device 262 cannot be read or written by planar 20, device 222, or any other device. Storage device 262 is utilized to store the private key for this planar, and to store the public key of the hard drive associated with this planar. Device 262 may be implemented utilizing an electronically erasable storage device, such as an EEPROM. Access may be gained to non-readable storage device 262 in order to initially store the private and public keys. However, after the keys are stored, they cannot be read. EEPROM 262 may be accessed by engine 260 to obtain the public key of the intended recipient device utilized when a message is to be encrypted to identify the intended device. The keys stored in EEPROM 262 may not be read by any component of planar 20 or data processing system 30.

Engine 260 and EEPROM 262 are coupled to PCI-ISA bridge 212 utilizing a system management (SM) bus 238. System management bus 238 is a two-wire, low speed, serial bus used to interconnect management and monitoring devices.

Hard drive 222 includes microcode 270, a security ASIC 275, and a controller 274. Security ASIC 275 includes an RSA engine 273 and protected storage device 272. ASIC 275 is implemented in a manner similarly to the implementation of ASIC 261. Storage device 272 is utilized to store the public key of the planar associated with this hard drive, and to store the private key of this hard drive. Similarly to device 262, device 272 may not be read by planar 20 or any device or component of planar 20. Access to device 272 is limited to engine 273.

When a message is transmitted from planar 20 to a device, the public key stored within and utilized by planar 20 identifies the particular, intended destination device. As an example, planar 20 may attempt to send a message to the hard drive stored within system 30 utilizing the public key for a hard drive stored in EEPROM 262. If this public key is the public key which identifies hard drive 222, hard drive 222 will receive the message and utilize the hard drive's private key stored in EEPROM 272 as well as engine 273 to decode the message.

Similarly, when a message is transmitted from hard drive 222 to planar 20, the public key stored in EERPOM 272 for the planar 20 and this hard drive's private key is utilized by engine 272 to encrypt the message. As an example, hard drive 222 may attempt to send a message to planar within system 30 utilizing the public key for the planar stored in EEPROM 272. If this public key is the public key which identifies this particular planar 20, planar 20 will receive the message and utilize the planar's private key stored in EEPROM 262, as well as engine 260, to decode the message.

Figure 3:
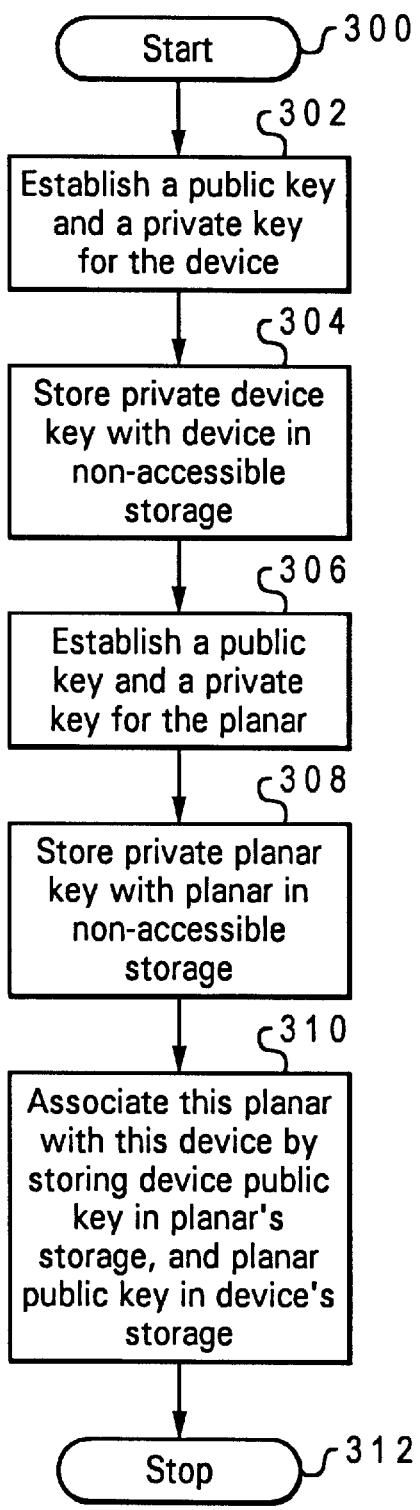
FIG. 3 illustrates a high level flow chart which depicts establishing public and private keys, and associating devices by storing the keys in non-accessible storage in accordance with the method and system of the present invention.

FIG. 3 illustrates a high level flow chart which depicts establishing public and private keys, and associating devices by storing the keys in non-readable storage in accordance with the method and system of the present invention. The process starts as depicted by block 300 and thereafter passes to block 302 which illustrates establishing a public key and a private key for a device such as a hard drive. A hard drive's public and private keys are associated with, and identify, a particular hard drive. Next, block 304 depicts the storage of the hard drive's private key with the hard drive in the EEPROM 272 included within the hard drive.

The process then passes to block 306 which illustrates establishing a public key and a private key for a planar. A planar's public and private keys are associated with, and identify, a particular planar. Next, block 308 depicts the storage of the planar's private key with the planar in the EEPROM 262 included within the planar. Thereafter, the process passes to block 310 which illustrates the association and unique authentication of this particular planar with this particular hard drive by storing the planar's public key in EEPROM 272 in the hard drive, and by storing the hard drive's public key in EEPROM 262 in the planar. In this manner, the planar's EEPROM 262 includes the planar's private key and the hard drive's public key. And, the hard drive's EEPROM 272 includes the hard drive's private key and the planar's public key. The planar's public key is not stored within the planar. Similarly, the hard drive's public key is not stored within the hard drive. The process then terminates as illustrated by block 312.

Figure 4:
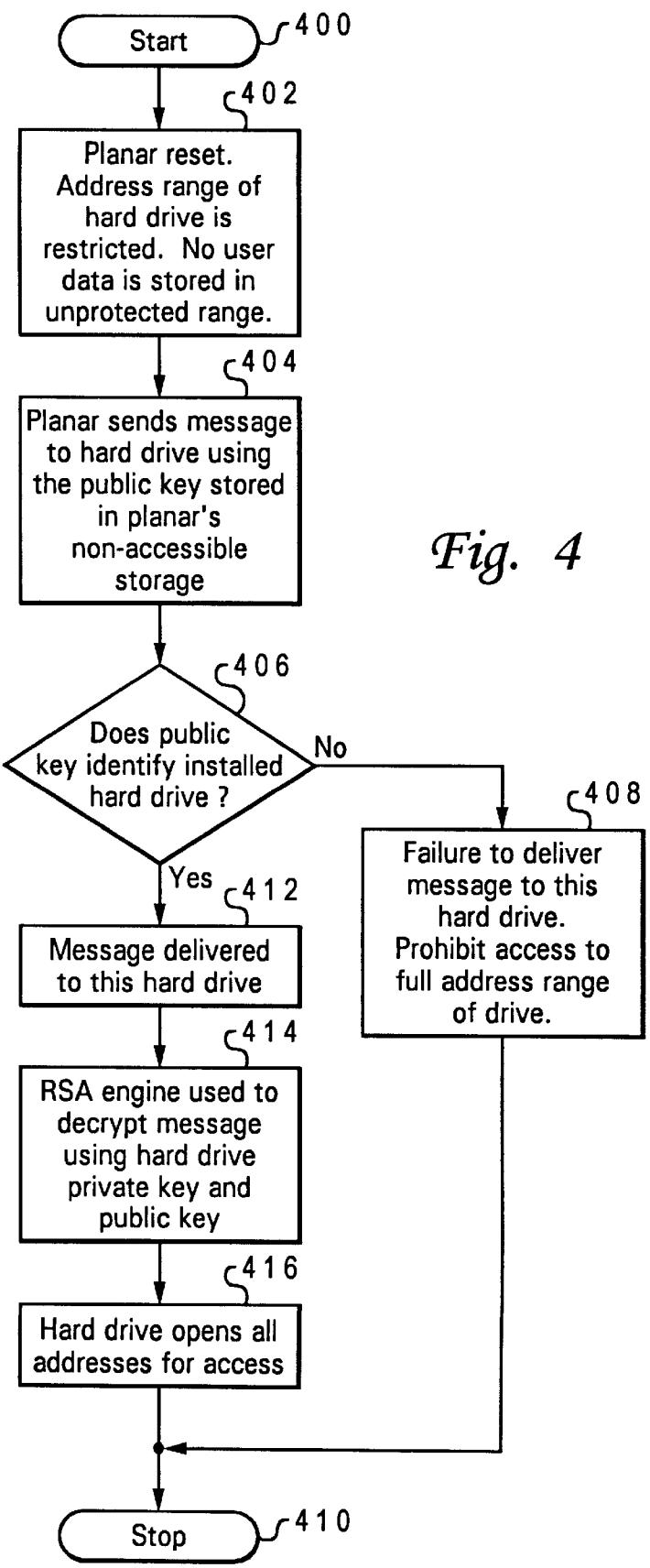
FIG. 4 depicts a high level flow chart which illustrates an attempt by a planar to access a device, such as a hard drive, utilizing the stored keys in accordance with the method and system of the present invention.

FIG. 4 depicts a high level flow chart which illustrates an attempt by a planar to access a hard drive utilizing the stored keys in accordance with the method and system of the present invention. The process starts as illustrated by block 400 and thereafter passes to block 402 which depicts the resetting of the planar. Upon this reset, the address range of the hard drive is restricted. Only an unprotected range of addresses not including any user data may be accessed at this time.

Next, block 404 depicts the planar attempting to transmit a message to the hard drive installed within computer 12. The planar utilizes the hard drive public key stored within EEPROM 262 to encrypt the message. Thereafter, block 406 illustrates a determination of whether or not the hard drive public key identified the hard drive coupled to this planar. If a determination is made that the hard drive public key does not identify the hard drive coupled to the planar, the process passes to block 408 which depicts a failure to deliver the message to the hard drive, thus, prohibiting access to the full address range of the hard drive. Therefore, the hard drive will not open its full address range. The process then terminates as illustrated at block 410.

Referring again to block 406, if a determination is made that the hard drive public key does identify the hard drive coupled to the planar, the process passes to block 412 which depicts a successful delivery of the message to the hard drive. Next, block 414 illustrates the encryption/decryption engine, such as the RSA engine, utilizing the private key stored in EEPROM 262 for the hard drive to decrypt the message. Thereafter, block 416 depicts the hard drive opening its full address range for access. The process then terminates as illustrated by block 410.

While a preferred embodiment has been particularly shown and described, it will be understood by those skilled in the art that various changes in form and detail may be made therein without departing from the spirit and scope of the present invention.

What is claimed is:

1. A method in a data processing system for protecting data stored on a device included within said system, said method comprising the steps of:

establishing a device key pair identifying a particular device included within said system, said device including data stored within said device, said data initially being prohibited from being fully accessed, said device key pair including a device private key and a device public key;

establishing a planar key pair identifying a planar board included within said system, said planar key pair including a planar private key and a planar public key; and associating said particular device with said planar by storing said device public key only within said planar, and by storing said planar public key only within said particular device, wherein access to data stored within said device is limited to only a planar including said stored device public key.

2. The method according to claim 1, further comprising the steps of:
storing said device public key within protected storage within said planar; and
storing said planar public key within protected storage within said particular device.

3. The method according to claim 2, further comprising the steps of:
said planar transmitting a message to said particular device utilizing said stored device public key; and
said particular device responding to said message only if a determination is made that said device public key identifies said device.

4. The method according to claim 3, further comprising the step of said particular device responding to said message by permitting said planar to access all of said data.

5. The method according to claim 4, further comprising the steps of:
storing said device public key within non-readable storage within said planar; and
storing said planar public key within non-readable storage within said particular device.

6. The method according to claim 5, further comprising the steps of:
establishing said device key pair utilizing an asymmetric key encryption algorithm, said algorithm generating a device public key and a device private key; and
establishing a planar key pair utilizing said asymmetric key encryption algorithm, said algorithm generating a planar public key and a planar private key.

7. The method according to claim 6, further comprising the steps of:
storing said device private key and said planar public key only within said non-readable storage within said device, said planar public key identifying said particular planar board; and
storing said planar private key and said device public key only within said non-readable storage within said particular device, said device public key identifying said particular device.

8. The method according to claim 7, further comprising the steps of:
said planar transmitting said message to said particular device utilizing said stored device public key; and
said particular device responding to said message only if a determination is made that said device public key identifies said particular device.

9. The method according to claim 8, further comprising the step of said device utilizing said algorithm and said stored device private key to decrypt said message.

10. The method according to claim 9, further comprising the step of establishing a device key pair identifying a particular hard drive included within said system, said hard drive including data stored within said hard drive.

11. A data processing system for protecting data stored on a device included within said system, comprising;
said system executing code for establishing a device key pair identifying a particular device included within said system, said device including data stored within said device, said data initially being prohibited from being fully accessed, said device key pair including a device public key and a device private key;
said system executing code for establishing a planar key pair identifying a planar board included within said system, said planar key pair including a planar public key and a planar private key; and
said system executing code for associating said particular device with said planar by storing said device public key only within said planar, and by storing said planar public key only within said particular device, wherein access to data stored within said device is limited to only a planar including said stored device public key.

12. The system according to claim 11, further comprising:
protected storage within said planar for storing said device public key; and
protected storage within said particular device for storing said planar public key.

13. The system according to claim 12, further comprising:
said planar executing code for transmitting a message to said particular device utilizing said stored device public key; and
said particular device executing code for responding to said message only if a determination is made that said device public key identifies said device.

14. The system according to claim 13, further comprising said particular device executing code for responding to said message by permitting said planar to access all of said data.

15. The system according to claim 14, further comprising:
said protected storage within said planar being non-readable storage within said planar for storing said device public key; and
said protected storage within said device being non-readable storage within said particular device for storing said planar public key.

16. The system according to claim 15, further comprising:
said system executing code for establishing said device key pair utilizing an asymmetric key encryption algorithm, said algorithm generating a device public key and a device private key; and
said system executing code for establishing a planar key pair utilizing said asymmetric key encryption algorithm, said algorithm generating a planar public key and a planar private key.

17. The system according to claim 16, further comprising:
said system executing code for storing said device private key and said planar public only within said non-readable storage within said device, said planar public key identifying said particular planar board; and
said system executing code for storing said planar private key and said device public key only within said non-readable storage within said particular device, said device public key identifying said particular device.

18. The system according to claim 17, further comprising:
said planar executing code for transmitting said message to said particular device utilizing said stored device public key; and
said particular device executing code for responding to said message only if a determination is made that said device public key identifies said particular device.

19. The system according to claim 18, further comprising said device executing code for utilizing said algorithm and said stored device private key to decrypt said message.

20. The system according to claim 19, further comprising said system executing code for establishing a device public key identifying a particular hard drive included within said system, said hard drive including data stored within said hard drive.

21. A data processing system for protecting data stored on a removable hard drive included within said system, comprising;

said system executing an asymmetric key encryption algorithm for establishing a hard drive key pair identifying a particular hard drive included within said system, said hard drive including data stored within said hard drive, said data initially being prohibited from being fully accessed, said algorithm generating a hard drive public key and a hard drive private key;

said system executing said encryption algorithm for establishing a planar key pair identifying a planar board included within said system, said algorithm generating a planar public key and a planar private key;

said system executing code for associating said particular hard drive with said planar by storing said hard drive public key only within said planar, and by storing said planar public key only within said particular hard drive, wherein access to data stored within said hard drive is limited to only a planar including said stored hard drive public key;

protected, non-readable storage within said planar for storing said hard drive public key;

protected, non-readable storage within said hard drive for storing said planar public key;

said planar executing code for transmitting a message to said particular hard drive utilizing said stored hard drive public key;

said particular hard drive executing code for responding to said message only if a determination is made that said hard drive public key identifies said hard drive;

said particular hard drive executing code for responding to said message by permitting said planar to access all of said data; and said hard drive executing code for utilizing said algorithm and said stored hard drive private key to decrypt said message.

\* \* \* \* \*